United States Patent [19]

Jenneman et al.

[11] Patent Number: 5,341,875
[45] Date of Patent: Aug. 30, 1994

[54] INJECTION OF PHOSPHORUS NUTRIENT SOURCES UNDER ACID CONDITIONS FOR SUBTERRANEAN MICROBIAL PROCESSES

[75] Inventors: Gary E. Jenneman; Bennett Clark, both of Bartlesville, Okla.

[73] Assignee: Phillips Petroleum Company, Bartlesville, Okla.

[21] Appl. No.: 994,859

[22] Filed: Dec. 22, 1992

[51] Int. Cl.$^5$ .............................................. E21B 43/22
[52] U.S. Cl. .................................. 166/246; 166/307; 435/243; 435/281
[58] Field of Search ................. 166/246, 271, 307; 210/170, 747, 610, 611; 405/128; 435/243, 252.1, 281

[56] References Cited

U.S. PATENT DOCUMENTS

| | | | |
|---|---|---|---|
| 3,032,472 | 5/1962 | Hitzman | 195/3 |
| 3,846,290 | 11/1974 | Raymond | 166/246 X |
| 4,300,632 | 11/1981 | Wiberger et al. | 166/246 |
| 4,450,908 | 5/1984 | Hitzman | 166/246 |
| 4,460,043 | 7/1984 | Thompson et al. | 166/246 |
| 4,475,590 | 10/1984 | Brown | 166/246 |
| 4,522,261 | 6/1985 | McInerney et al. | 166/246 |
| 4,534,412 | 8/1985 | Dovan et al. | 166/295 |
| 4,552,217 | 11/1985 | Wu et al. | 166/270 |
| 4,558,739 | 12/1985 | McInerney et al. | 166/246 |
| 4,588,506 | 5/1986 | Raymond et al. | 166/246 X |
| 4,610,302 | 9/1986 | Clark | 166/246 |
| 4,732,680 | 3/1988 | Weaver et al. | 210/610 |
| 4,799,545 | 1/1989 | Silver et al. | 166/246 |
| 4,800,959 | 1/1989 | Costerton et al. | 166/246 |
| 4,905,761 | 3/1990 | Bryant | 166/246 |
| 4,906,575 | 3/1990 | Silver et al. | 435/253.6 |
| 4,941,533 | 7/1990 | Buller et al. | 166/252 |
| 4,947,932 | 8/1990 | Silver et al. | 166/246 |
| 4,971,151 | 11/1990 | Sheehy | 166/246 |
| 4,979,564 | 12/1990 | Kalpakci et al. | 166/273 |
| 4,991,652 | 2/1991 | Hoskin et al. | 166/270 |
| 5,083,610 | 1/1992 | Sheehy | 166/246 |
| 5,083,611 | 1/1992 | Clark et al. | 166/246 |

*Primary Examiner*—George A. Suchfield
*Attorney, Agent, or Firm*—Cynthia L. Stokes

[57] ABSTRACT

The present invention provides a process for injecting microbial nutrients into a subterranean formation wherein microorganism are provided a phosphorus nutrient source, and said phosphorus nutrient source into said formation under acid conditions.

6 Claims, No Drawings

INJECTION OF PHOSPHORUS NUTRIENT SOURCES UNDER ACID CONDITIONS FOR SUBTERRANEAN MICROBIAL PROCESSES

BACKGROUND

Nutrient selection and injection are controlling factors in many subterranean microbial processes. In order to achieve this specific objective, e.g. microbial enhanced oil recovery (MEOR) and bioremediation processes, the microorganisms utilized must be metabolically active and nutritiously sustained.

Numerous microorganisms suitable for achieving various microbial objectives in subterranean formations are known in the art. In order to achieve a specific microbial objective, suitable microorganisms can be selected and injected into the subterranean formation. Oftentimes, however, endogenous microorganisms well suited for achieving a particular microbial objective, are already present within the formation.

It is well established that these microorganisms basically require three utilizable nutrient sources to remain active. These sources are a carbon source, a nitrogen source, and a phosphorus source. The specificity of each reservoir will determine which nutrients are needed, as a reservoir may be deficient in any or all of the above nutrients. A common deficiency, however, is that of phosphorus, thus mandating that a phosphorus source be injected to sustain microbial activity. Inorganic phosphates are well known in the art for use as phosphorus nutrients, however, a problem associated with their use is the indepth transportation of these phosphates into the reservoir. The difficulty encountered in the transportation of inorganic phosphate is due to some extent to high concentration of divalent cations, and in particular calcium, found in reservoirs which complexes with the phosphates to render the phosphates insoluble and less able to be easily transported due to greater retention of the phosphate precipitate in the rock matrix. Thus, indepth penetration of the phosphate is not readily achieved.

Without an efficient method for indepth penetration of nutrients, excessive utilization and depletion of nutrients by microorganisms located at or near the injection borehole occurs. Excessive utilization and depletion of nutrients by microorganisms located in the vicinity of the borehole operates to prevent nutrient distribution and create excessive plugging in the vicinity of the borehole, i.e. faceplugging.

Therefore, a method to facilitate the indepth transport of the phosphorus nutrient source by increasing the solubility of the phosphates and/or dissolving acid soluble minerals that are responsible, at least in part, for the phosphate retention would be a significant contribution to the art.

It is therefore an object of this invention to provide a method for facilitating the transportation of phosphorus nutrient sources deep within the reservoir to achieve indepth nutrient distribution and to prevent excessive plugging in the vicinity of the borehole.

It is another object of this invention to provide a method of transport for inorganic phosphates whereby their solubility is increased and they are less retainable by rock matrix of the reservoir.

It is a further object of this invention to provide a method for indepth phosphate transportation whereby acid soluble minerals are dissolved thus decreasing phosphate retention in the rock matrix of the reservoir.

These and other objects of the present invention will become apparent upon inspection of the disclosure and the claims herein provided.

SUMMARY OF THE INVENTION

In accordance with the present invention, we have discovered that when a phosphorus nutrient source is injected into a reservoir under acid conditions, the indepth transportability of said phosphate is greatly facilitated. With the addition of acid, the solubility of the phosphorus increases, retention of phosphorus decreases, and acid soluble minerals located within the rock matrix are dissolved.

A process is therefore provided for injecting microbial nutrients into a subterranean formation wherein microorganisms are provided a phosphorus nutrient source and said phosphorus nutrient is injected under acid conditions.

DETAILED DESCRIPTION

The injection of a phosphorus nutrient source under acid conditions as disclosed herein can generally be used in conjunction with any process wherein microbial activity is induced in a subterranean formation. Examples of such processes include microbial enhanced oil recovery, (MEOR) processes used in oil-bearing subterranean formations, and bioremediation processes used in aquifers. Typical microbial enhanced oil recovery processes include those wherein microorganisms are used to alter subterranean formation permeability and those wherein microorganisms are used for in-situ generation of chemicals useful for enhanced oil recovery. Examples of in-situ generated chemicals include water-soluble polymers, surfactants, solvents such as ethanol and acetone, acids, carbon dioxide, etc.

The present inventive process is particularly well suited for use in conjunction with MEOR processes conducted in oil-bearing subterranean formations contain porous rock with heterogenous zones of permeability. Water, used to mobilize oil in a waterflood, preferentially invades the high permeability zones due to these zones' decreased resistance to flow. This causes large reserves of oil, contained in the lower permeability regions, to be bypassed. In microbial enhanced oil recovery processes, nutrients are fed to microorganisms located in high permeability formation zones. The nutrients stimulate the microorganisms and cause the microorganisms to generate an increased biomass. This increased biomass results from cell growth and/or the biological production of polymer(s). Once the high permeability formation zones have been plugged, water is diverted to the previously uninvaded low permeability zones and thereby displaces oil contained in the low permeability zones.

The microorganisms used in conjunction with the present invention are selected for the attainment of a desired microbial objective and then injected into the subterranean formation. Preferably, such microorganisms when used, are injected into the formation prior to nutrient injection. As is known in the art, the particular microorganisms chosen for injection should be tolerant of the conditions, e.g., temperature, pH, salinity etc., existing in the formation. Microorganisms can be injected into subterranean formations using methods which are well known in the art. The preferred microorganism injection method will depend upon the microorganism(s) chosen, and the specific characteristics of the formation. Oftentimes, endogenous microorganisms capable of achieving a desired microbial objective are already present within the subterranean formation. In order to cause the microorganisms within a subterranean formation, whether endogenous or injected, to produce a desired in-situ result, deficient nutrient components are injected into the formation which facilitates the regulation of where, in the formation, a complete nutrient package is formed and hence microbial activity occurs. Deficient nutrient components are those individual nutrient components which are needed by the microorganisms for achievement of a desired microbial objective and which are not already present within the formation in amounts sufficient for achieving the microbial objective. Subterranean formations are typically deficient in either phosphorus, nitrogen, or carbon nutrients, or combinations thereof. Suitable phosphorus sources and nitrogen sources (e.g., ammonium-containing compounds such as ammonium chloride, nitrates such as potassium nitrate, and organic nitrogen sources such as amino acids and peptides), as well as carbon sources (e.g., fats, proteins, simple carbohydrates and complex carbohydrates), and other nutrient sources which are suitable for use in nutrient injection methods are well known in the art.

To achieve biomass production at desired cites, nutrient sources must be easily transported to indepth areas within subterranean formations. When a phosphorus nutrient source is injected under acid conditions, the solubility of the phosphorus nutrient source is increased and indepth transport is facilitated. Thus, when injecting microbial nutrients into a subterranean formation wherein microorganisms are provided a phosphorus nutrient source, indepth penetration and transportation of said phosphorus nutrient source is facilitated when the injection is conducted under acid conditions.

The preferable phosphorus nutrient source used in accordance with the present invention is a solution of an inorganic phosphate. Any inorganic phosphate can be used in practicing the present invention as the solubility of the inorganic phosphate will increase with its acidification and it will therefore be less retainable by rock matrix of the reservoir. One preferred example of an inorganic phosphate is an orthophosphate.

As presently practiced, nutrient injection "under acid conditions" refers to acidifying a phosphorus nutrient source solution and thereafter injecting the solution into a subterranean reservoir where microorganisms, as discussed above, are either already present, or are thereafter injected into the reservoir. To accomplish this acidification of the phosphorus solution, acid is added in an amount sufficient to achieve a pH in the range of about 1.0 to about 5.5 prior to injection into the reservoir.

When an inorganic phosphate is used as the phosphorus nutrient source, it has been discovered that the acidification should be performed to achieve a preferred pH of about 4.5.

The acid used in practice of the present invention includes but is not limited to an acid selected from the group consisting of hydrochloric acid, phosphoric acid, nitric acid, and sulfuric acid. A preferred acid is hydrochloric acid.

In addition to acidifying a solution containing a phosphorus nutrient source, the reservoir can optionally pre-flood with a strong acid in an amount sufficient to dissolve acid-soluble minerals. Said acid is selected from the group consisting of hydrochloric acid, phosphoric acid, nitric acid, and sulfuric acid. A preferred acid is hydrochloric acid. Pre-flooding refers the injection into the reservoir rock, of a strong acid prior to injecting a phosphorus nutrient source. Acid is added until an equilibrium is reached with respect to equivalents of acid; i.e., an amount of acid equal to that amount being injected simultaneously leaves the reservoir. This pre-flooding allows the acid to dissolve minerals such as iron often found in chamosite clay. Retention of the phosphorus source is thereby reduced and indepth transport is facilitated.

EXAMPLES

The following examples have been provided merely to illustrate the practice of the invention and should not be read as to limit the scope of the invention or the appended claims in any way.

The following tests were conducted using core sample plugs from the Burbank field, Osage County, Okla. Each core sample plug was obtained by drilling a 3.5-inch diameter core along its bedding plane using a hollow core bit. Tapped Ryton end plates were epoxied to the ends of each sample plug and the remainder of the plug was coated with epoxy resin. The properties of each of the four core samples used are listed in Table I.

TABLE I

| Core | Core Properties | | | |
|---|---|---|---|---|
| | A | B | C | D |
| Length (CM) | 8.780 | 8.240 | 8.500 | 7.891 |
| Diameter (CM) | 2.52 | 2.52 | 2.52 | 2.49 |
| Permeability (mD) | 295.3 | 505.6 | 625.8 | 432.6 |
| Porosity | .25 | .25 | .25 | .25 |
| Core Vol (cc) | 10.9 | 10.3 | 10.6 | 10.0 |

The brine used in these tests was obtained from the tank batteries at Tract 5 (T5) of the Burbank field. This brine was approximately 10 percent (wt/vol) total dissolved solids containing over 30,000 ppm sodium and over 60,000 ppm of chloride and 6,000 ppm calcium as the major ionic species.

All cores were vacuum saturated with filtered 0.22 micron cellulose ester membrane filters T5 brine and then flooded with filtered and centrifuged Burbank crude oil to immobile water saturation. The cores were then flooded to residual oil saturation with filtered T5 brine. All steps were performed with brine and oil that had been preincubated in an anarobic glove-box to prevent oxidation of the metals in the brine. In order to maintain anaerobiosis all brine and oil was pumped from inside the glove-box to the cores that were outside the glove-box via pass through fittings in the walls of the glove-box. All tubing used to transmit fluids was ⅛-inch (O.D.) nylon tubing which is impermeable to oxygen.

The source of ortho-phosphate used in this study was ortho-phosphoric acid (85 percent), manufactured by Fisher Scientific. The hydrochloric acid used was also from Fisher Scientific. Sodium trimetaphosphate (STMP) was obtained as commodity grade from Monsanto Chemical Company, St. Louis, Mo.

Phosphate and Acid Adsorption

The cores flooded to residual oil saturation were used in phosphate adsorption studies. Cores were placed inside a 45° C., incubator which was housed inside an anaerobic glove-box (10 percent $H_2$, 5 percent $CO_2$, 85 percent $N_2$). The reservoir containing the phosphate and brine was also housed inside the glove-box at room temperature. Sodium trimetaphosphate was added to the brine as a powder. This solution was then filtered through a 0.2 uM membrane filter before injection into the core at a velocity of 1 ft/d. For cores A and C, phosphoric acid (18M) was diluted 1:10 with distilled water and then 1 ml of this diluted acid added to 500 ml of filtered T5 brine acidified with HCl (0.12M). Therefore, the initial injected concentration of phosphate was approximately 342 mG/L. This solution was pumped through each core via a peripatetic pump at approximately a 4 ft/d velocity. Effluent was pumped outside the glove-box and collected in 15 ml fractions by means of a fraction collector. Samples would then be sent to the Analysis Branch to be analyzed for phosphorus content by inductively coupled plasma. Answers could be converted to phosphate by multiplying by 3.06. The stannous chloride method as described in APHA Standard Methods (APHA, 1975) was also used for phosphate quantitation. The amount of adsorbed phosphate was calculated by subtracting the weight of the non-adsorbed phosphate from the total injected once equilibrium between adsorbed and desorbed phosphate had been achieved. Desorption of phosphate was then determined by injecting either filtered T5 brine without phosphate, or the acidified filtered T5 brine without phosphate.

Acid adsorption in each core was determined by flooding Core B at a velocity of 4 ft/d with filtered T5 brine containing 1.0N HCl. Acid in the effluent from the flooding was titrated with a standard 1.0N NaOH solution that had been standardized with potassium hydrogen phthalate. The endpoint (i.e. pH 7.0) was determined potentiometrically using a Fisher Accumet pH meter. Acid injection continued until the core attained an equilibrium between the acid being injected and that produced. At this point, the amount of adsorbed acid could be calculated by the difference between the amount injected and the amount non-adsorbed.

Example I

In FIG. 1, 1.56 mM sodium trimetaphosphate (STMP) was added to T5 brine and was injected through core D. The results indicate that after over 90 pore volume (PV) of injected STMP the phosphate concentration failed to reach equilibrium. This suggested that retention in addition to that associated with physical adsorption was occurring. High concentrations of divalent cations reduced the solubility of ortho-phosphate and hence interfered with the ability of the phosphate to reach equilibrium with the rock surface. Sodium trimetaphosphate was found to display good solubility in the Tract 5 brine but the calcium and temperature decreased the chemical stability of STMP, an inorganic, cyclic, phosphate polymer, enhancing its hydrolysis to less soluble forms. These hydrolysis forms include tripolyphosphate, pyrophosphate, and ortho-phosphate.

Phosphates are used as clay dispersants since they are known to complex with the positively charged aluminum ions found on the edges of clays thereby reducing adsorption to the negatively charged lattice. Compounds such as chelants might preferentially complex with these competing cations thereby increasing phosphate solubility. We previously demonstrated that some beneficial effect on desorption of ortho-phosphate could be realized by the addition of the chelant sodium citrate to the brine. However addition of 1 mN sodium citrate to the desorbing brine in this core produced only a slight increase in desorbing phosphate. The subsequent addition of 100 mM sodium bicarbonate resulted in an eventual decrease in desorbing phosphate. Carbonates are known to compete with phosphate for adsorption sites; however, they were ineffective in enhancing desorption in this case.

The addition of acid (0.004N HCL) to the desorbing phase resulted in a sudden drop in phosphate desorption which was followed by a steady rise in desorbing phosphate that reached almost twice the desorbing concentration of Tract 5 brine alone. Chemical examination of the effluent brine during acid addition indicated that, not only were phosphate levels increasing but that calcium levels were increasing as well. One possible explanation is that the acid treatment resulted in dissolution of calcium phosphate. Calcium phosphates are known to be more soluble at acid pH. There is no indication of increasing levels of iron during the acid treatment which would be indicative of increased solubility of iron phosphates characteristic of iron-containing chamosite clay dissolution.

Example II

In core A acid was added to the adsorbing phase in order to determine the acid's effect on the adsorption of phosphate. In this experiment ortho-phosphoric acid was used at an injected concentration of 0.12M (thirty times more concentrated than that used in core D). By the end of the adsorption phase a total of 142.5 mG of phosphate had been injected into core A of which 95.7 mG were recovered in 42 PV of effluent. Therefore, 46.8 mG of phosphate were adsorbed which relates to a reservoir adsorption of approximately 2902 lbs phosphate/Ac-ft. of rock. Equilibrium was attained after approximately 38 or 39 PV of phosphate had been injected. This is in contrast to previous studies performed at near neutral pH solutions using a similar concentration of phosphate in which equilibrium conditions were not attained after over 200 pore volumes of phosphate were injected. This suggests that acid conditions can increase phosphate solubility and therefore enhance phosphate transport.

During the desorption phase of the experiment the acidified brine resulted in recovery of 37 mG of phosphate within 30 PV of brine injection. Therefore, approximately 80 percent of the adsorbed phosphate was desorbed. The phosphate desorbed at an exponential rate over the 30 PV of desorption. Desorption rates are very important when modelling transport kinetics since the desorbed phosphate can be propagated further into the reservoir while the non-desorbing phosphate is fixed; however, the adsorbed phosphate still remain a potential source of phosphate for microbial growth once the organic slug is injected. This is because microorganisms produce acids and organic Celanese which can solubilize adsorbed phosphates.

Example III

Core C obtained from the same well location as Core A (Example 2), was injected with approximately 229 mG/L phosphate under similar conditions. This core attained equilibrium with respect to phosphate concentration within approximately 48 PV. However, in the core over 75.6 percent of the phosphate injected was adsorbed vs. 32.8 percent for core A once equilibrium was attained. Furthermore, the shapes of the two adsorption curves were quite different. The breakthrough of phosphate in core C was delayed for 20–30 PV whereas phosphate in core A appeared in the effluent within a matter of several PV. Therefore, large differences in adsorption rate and capacity can be realized from cores cut from the same location. In addition, core A was pre-equilibrated with filtered T-5 brine overnight whereas core C was pre-equilibrated for only 4 hours. These results suggest that adsorption data should be obtained from several cores within the same location and averaged, if possible.

Desorption of phosphate in core C was performed by injecting filtered T5 brine that had not been acidified (pH approximately 6.1) to determine its effect vs. desorption in the presence of acid (core A). Less than 9 percent of the phosphate adsorbed was desorbed vs. 79 percent for core A after injecting a similar number of pore volumes. Therefore, the results indicate that acid significantly affects not only adsorption of phosphate but desorption as well.

Phosphate transport was enhanced at low pH. This suggests that either the low pH enhanced phosphate solubility in T5 brine and/or that some property of the Burbank rock had been altered to allow better transport.

Example IV

To test what effect the acid had on the rock, Burbank Core B was pre-flooded to equilibrium with respect to equivalents of acid. The resulting titration curve of Burbank core B indicates a pH buffering capacity between a pH of 3.00 and 3.25. Equilibrium was attained after 9.0–10.0 PV of 1.0N HCl had been injected. Approximately 2533 pounds acid/Ac-ft of rock was retained at equilibrium. During the injection of acid a large amount of undissolved gas was observed exiting the core as well as a copious amount of sludge that was green in color. Upon oxidation of the sludge it turned orange suggesting the presence of ferric iron. A likely explanation is that the acid is dissolving the iron-containing chamosite clay.

Using the same acid treated core (core B), a solution of 300 ppm phosphate, as ortho-phosphoric acid, was injected along with 0.1N HCl and effluent fractions collected and analyzed for phosphorus. The results indicate that the phosphate solution reached equilibrium within 3–5 pore volumes of injection. This is in contrast to the approximately 38 or 39 pore volumes of a similar acid-phosphate solution needed to reach equilibrium in a core that had not been pre-treated with acid (FIG. 3). These results suggest that the acid removed something from the core that was responsible for the strong retention of phosphate. It is likely that the stronger acid solution dissolved the chamosite clay which could presumably be responsible for phosphate adsorption. In support of this the ICP analysis of the effluent fractions indicated that soluble iron decreased from 1,450 ppm in the first couple of pore volumes to 713 ppm by the sixth pore volume. No change in calcium concentration was observed. Normal iron concentrations in core effluents under non-acidic conditions are approximately 20 ppm indicating that the strong acid conditions are responsible for a significant increase in solubilized iron. Therefore, weak acid solutions (0.12N HCl) could solubilize and stabilize calcium phosphate as well as some iron; whereas, stronger concentrations of acid are needed to remove substantial amounts of iron-rich, phosphate-binding clays.

That which is claimed is:

1. In a process for injecting microbial nutrients into a subterranean formation wherein microorganisms are provided a phosphorus nutrient source, the improvement which comprises introducing as said phosphorus nutrient source a solution of an inorganic phosphate wherein said inorganic phosphate solution is acidified by the addition of an acid in an amount sufficient to achieve a pH in the range of about 1.0 to about 5.5, and then injected into said formation.

2. A process according to claim 1 wherein said inorganic phosphate solution to be injected has the pH of about 4.5.

3. A process according to claim 1 wherein said acid conditions are achieved by the addition of an acid selected from the group consisting of hydrochloric acid, phosphoric acid, nitric acid, and sulfuric acid to said inorganic phosphate solution prior to addition of same to said formation.

4. A process according to claim 3 wherein said acid is hydrochloric acid.

5. A process according to claim 1 wherein said acid conditions are additionally achieved by the pre-flooding of a reservoir with a strong acid in an amount sufficient to dissolve acid-soluble minerals, and said acid is selected from the group consisting of hydrochloric acid, phosphoric acid, nitric acid and sulfuric acid.

6. A process according to claim 5 wherein said acid is hydrochloric acid.

* * * * *

UNITED STATES PATENT AND TRADEMARK OFFICE
CERTIFICATE OF CORRECTION

PATENT NO. : 5,341,875
DATED : August 30, 1994
INVENTOR(S) : Gary E. Janneman, et. al.

It is certified that error appears in the above-indentified patent and that said Letters Patent is hereby corrected as shown below:

Title page, item [75], Inventor: the second inventor's name should read -- "J. Bennett Clark".

Signed and Sealed this

Twenty-second Day of August, 1995

*Attest:*

BRUCE LEHMAN

*Attesting Officer*     *Commissioner of Patents and Trademarks*